March 11, 1958  B. P. ASTLEY  2,826,063
HYDRAULIC RUPTURE TESTING MACHINE
Filed Aug. 23, 1954
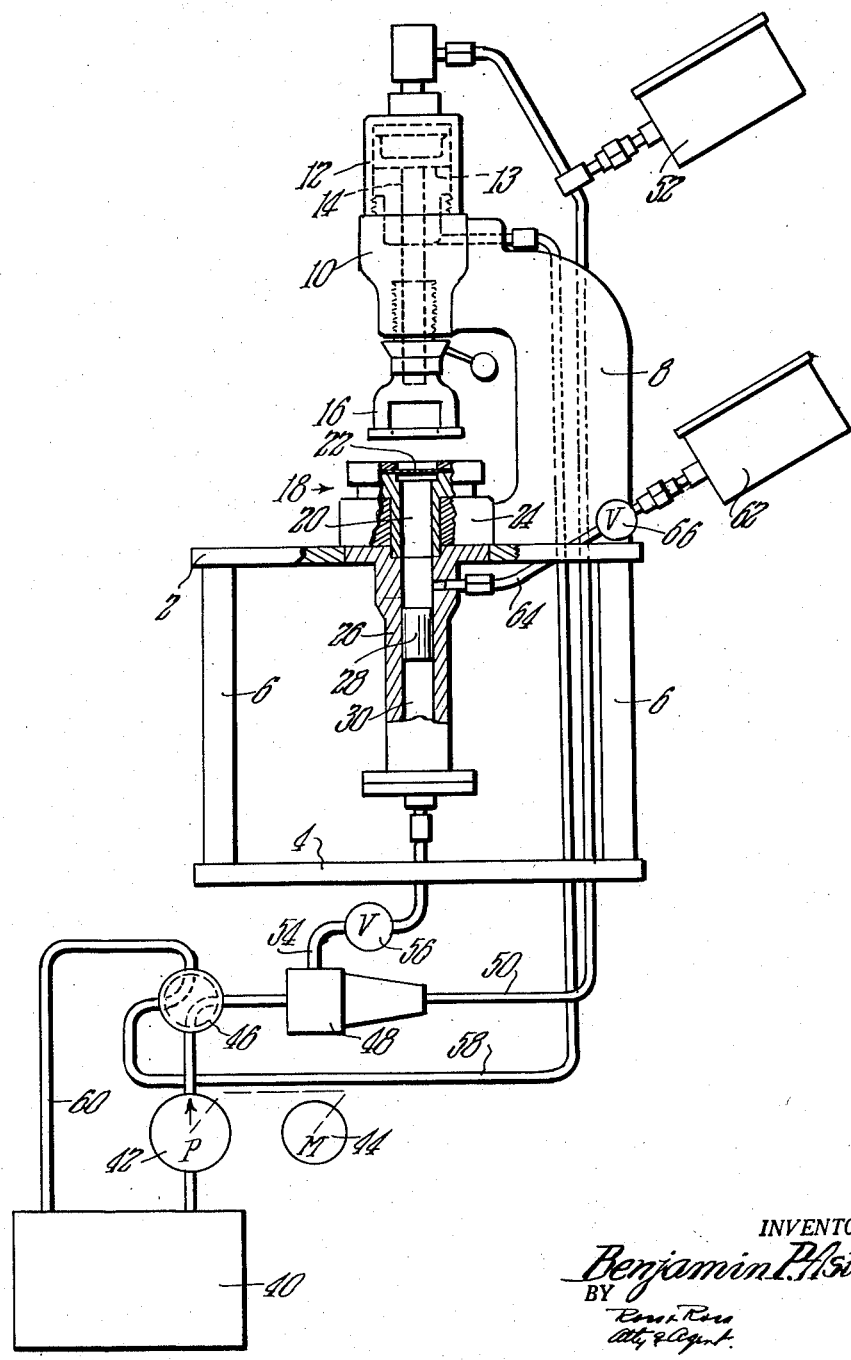
INVENTOR.
Benjamin P. Astley
BY
Ross & Ross
Atty & Agent

2,826,063
Patented Mar. 11, 1958

2,826,063

HYDRAULIC RUPTURE TESTING MACHINE

Benjamin P. Astley, Holyoke, Mass., assignor to B. F. Perkins & Son, Inc., Holyoke, Mass., a corporation of Massachusetts Application August 23, 1954, Serial No. 451,651

1 Claim. (Cl. 73—102)

This invention relates to improvements in testing machines and is directed more particularly to testing machines for testing the strength of specimens of sheet material, such as paper or the like, of the type shown in U. S. Patent No. 1,019,721 of March 5, 1912 to Munson.

The principal objects of the invention are directed to the provision of means in a testing machine of the class described for clamping a specimen to a platform and for rupturing the clamped specimen by pressure.

According to novel features of the invention, the rupturing pressure is applied quickly following the clamping operation so that the time of a testing operation is reduced to a great extent over the testing time of prior art apparatus and without the necessity of manual labor in the testing of specimens.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

The figure is an elevational view of a testing machine embodying the novel features of the invention.

Referring now to the drawings more in detail, the invention will be fully described.

Upper and lower plates 2 and 4 are secured together in vertically spaced relation by posts 6 so as to provide a supporting structure.

A frame 8 is disposed on and secured to the plate 2 and extends upwardly therefrom and has an upper portion 10.

A cylinder 12 which may be called a clamp cylinder is secured to the upper side of portion 10, and is closed at its upper end, and a piston 13 is reciprocable therein. A rod 14 extends downwardly from the piston 13 and through portion 10 and carries on its lower end a specimen clamp 16 for clamping a specimen to a platform 18 disposed therebelow.

The platform 18 has an opening 20 over which is a stretchable or distendable diaphragm 22. Said clamp and platform are similar to that shown in U. S. Patent #1,901,359 of March 14, 1933 to Senna.

The platform is secured in a lower portion 24 of the frame 8.

A rupturing cylinder 26 is secured to portion 24 and extends downwardly therefrom. A piston 28 may be reciprocable in a bore 30 of the cylinder 26.

With the specimen placed on the platform 18, same is clamped thereto by the clamp as pressure is applied to the piston 13. With liquid such as glycerine or the like in bore 20 and as pressure is applied to piston 28, the liquid acts to distend the diaphragm 22 and rupture a specimen clamped to the platform 18 by clamp 16.

A reservoir 40 for liquid such as oil or the like is provided. A pump 42 driven by an electric motor 44 supplies liquid under pressure to a four-way valve 46. A sequence valve 48 is supplied with liquid under pressure from valve 46.

The sequence valve 48 has one outlet connected by conduit 50 to the upper side of the clamp cylinder 12. Said conduit has a pressure gauge 52 connected thereto to indicate the clamping pressure. Said sequence valve has a second or secondary outlet connected by conduit 54 to the bottom of the cylinder 26. Conduit 54 is provided with a flow valve 56. The bottom of the cylinder 12 is connected by return conduit 58 to the valve 46 and said valve is connected by conduit 60 to reservoir 40.

A gauge 62 is connected to the bore of the cylinder 26 by a conduit 64 which has a shut-off valve 66 therein. Said gauge indicates the rupturing pressure obtained in the operation of the apparatus.

Sequence valve 48 will be such that, with liquid pressure applied thereto, it will first supply pressure to the upper side of the cylinder 12 to bring about the movement of clamp 16 so as to clamp a specimen to the platform and thereafter, when a predetermined pressure has been applied to the specimen, pressure is applied to piston 28 so as to build up the specimen bursting pressure beneath the diaphragm. The maximum clamping and bursting pressure may be as desired and gauge 62 will indicate the pressure attained below the diaphragm. Preferably the bursting pressure will be applied quickly following the clamping of the specimen so as to provide rapid operation of the apparatus.

The valve 56 will be such as to provide a certain desired rate of flow of liquid or pressure to cylinder 26 over a certain unit of time.

As shown, the position of valve 46 is such that as the pump 42 is operated, pressure is applied to clamp piston 13 and liquid therebelow is returned to the reservoir. Thereafter, according to the operation of the sequence valve 48, pressure is applied to the rupturing cylinder.

By adjusting valve 46, pressure is released at the top of piston 13 and at the bottom of cylinder 26 and pressure is applied to the lower side of piston 13 in sequence, all as may be desired so as to attain the desired succession of stages or steps.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Hydraulic testing apparatus for rupturing a specimen of sheet material comprising in combination, a support, upper clamping and lower rupturing cylinders secured to said support in vertically and axially aligned relation with adjacent inner ends being normally spaced vertically apart, a flexible diaphragm secured over the upper end of said rupturing cylinder, a clamp piston reciprocable in said clamping cylinder between upper non clamping and lower clamping positions, a clamp connected to said clamp piston for clamping a specimen over said diaphragm in the clamping position of said clamp piston, a rupturing piston reciprocable in said rupturing cylinder and adapted by application of liquid pressure to the underside thereof to actuate said diaphragm for rupturing a specimen clamped thereover, a liquid reservoir, an electrically driven pump connected to said reservoir and having a delivery outlet, a return conduit connected into said reservoir, a first conduit connected to the upper end of said clamping cylinder for moving said clamping piston downwardly to clamping position, a second conduit connected to the lower end of said clamping cylinder for delivering liquid under pressure to move said clamp piston to non-clamping position, a third conduit connected to the lower end of said rupturing cylinder below said rupturing piston for delivering liquid under pressure to said rupturing cylinder for moving said rupturing piston upwardly in rupturing direction, a sequence valve for supplying pressure successively through said first conduit to said clamping cylinder above said clamp piston for moving said clamp downwardly into clamping position and through said third conduit to said rupturing cylinder for distending said diaphragm and through said second conduit to said clamping cylinder below said clamp piston for moving said clamp upwardly into non-clamping position, a four-way valve connected to said sequence valve and to the delivery outlet of said pump and to said second conduit and the return conduit of said reservoir and a measuring means connected to said rupturing cylinder for measuring the rupture pressure therewithin, all adapted and arranged whereby pressure may be alternately applied to said clamping cylinder and said rupturing cylinder.

References Cited in the file of this patent

UNITED STATES PATENTS

| | | |
|---|---|---|
| 1,473,963 | Mills | Nov. 13, 1923 |
| 2,340,733 | Clark | Feb. 1, 1944 |
| 2,509,142 | Getchell | May 23, 1950 |
| 2,525,345 | Getchell | Oct. 10, 1950 |
| 2,557,184 | Getchell | June 19, 1951 |
| 2,565,371 | Hollis | Aug. 21, 1951 |

FOREIGN PATENTS

| | | |
|---|---|---|
| 19,966 | Great Britain | Sept. 7, 1906 |